United States Patent [19]

Wells

[11] 4,045,958
[45] Sept. 6, 1977

[54] MULTI-DIRECTIONAL POSITIONER
[75] Inventor: William M. Wells, Midfield, Ala.
[73] Assignee: Thomas H. Hudson, Birmingham, Ala. ; a part interest
[21] Appl. No.: 670,571
[22] Filed: Mar. 25, 1976
[51] Int. Cl.² .......................... F01C 9/00; F15B 7/00
[52] U.S. Cl. ...................................... 60/325; 60/533; 92/120; 92/122
[58] Field of Search .................. 92/120, 121, 122, 123, 92/124, 125, 67, 119; 60/325, 533

[56] References Cited
U.S. PATENT DOCUMENTS

| 2,557,912 | 6/1951 | Lane | 92/122 |
| 2,691,348 | 10/1954 | Gunther | 92/120 |
| 2,984,221 | 5/1961 | Voorhees | 92/122 |
| 3,492,974 | 2/1970 | Kreimeyer | 92/120 |
| 3,766,831 | 10/1973 | Yeakley | 92/122 |

Primary Examiner—Paul E. Maslousky
Attorney, Agent, or Firm—Woodford R. Thompson, Jr.

[57] ABSTRACT

A multi-directional positioner for moving one element relative to another element wherein a socket in a housing receives a ball with a rotating fit with a portion of the ball projecting outwardly of the socket and being connected to one element and the housing being connected to the other element. An arcuate groove in the socket extends in a plane passing generally through the center of the ball and receives a piston which is pivotally connected to the adjacent side of the ball. An arcuate groove in the outer surface of the ball extends in a plane passing generally through the center of the ball and perpendicular to the groove in the socket and receives a piston which is pivotally connected to the adjacent portion of the housing. Fluid is introduced under pressure selectively into the arcuate grooves in the ball and the arcuate groove in the socket to impart relative movement between the ball and the housing.

7 Claims, 5 Drawing Figures

MULTI-DIRECTIONAL POSITIONER

BACKGROUND OF THE INVENTION

This invention relates to a multi-directional positioner for moving one element relative to another whereby a work piece or tool carried by one element may be moved selectively to a plurality of positions both laterally and vertically.

Heretofore in the art to which my invention relates, many devices have been proposed for operatively connecting one element to another element whereby relative movement is imparted between the elements to thus move at least one of the elements to selected positions. Such devices are complicated in construction and are very expensive to manufacture and maintain. Also, such devices require a considerable amount of space for the operation thereof. That is, such devices usually comprise ring gears, pinion gears, worm gear reducers and the like, or fluid pressure operated cylinders which require piston rods, links and similar equipment.

BRIEF SUMMARY OF INVENTION

In accordance with my invention, I provide a multi-directional positioner for moving one element relative to another wherein a ball and socket type unit is operatively connected to the elements. An arcuate groove is provided in the socket and extends in a plane passing generally through the center of the ball and receives a piston which is pivotally connected to the adjacent side of the ball. Also, an arcuate groove is provided in the outer surface of the ball and extends in a plane passing generally through the center of the ball and perpendicular to the groove in the socket and receives a piston which is pivotally connected to the adjacent portion of the housing. Means is provided for introducing fluid under pressure selectively into the arcuate grooves in the ball and socket to impart relative movement between the ball and the socket. Accordingly, my improved positioner is simple of construction, economical of manufacture, requires a fewer number of parts and brings about a greater savings in space required to install the unit. Also, my improved directional positioner is simple to operate whereby it may be operated by unskilled labor.

DESCRIPTION OF THE DRAWINGS

Apparatus embodying features of my invention is illustrated in the accompanying drawings, forming a part of this application, in which.

DETAILED DESCRIPTION

Figures 2, 4:
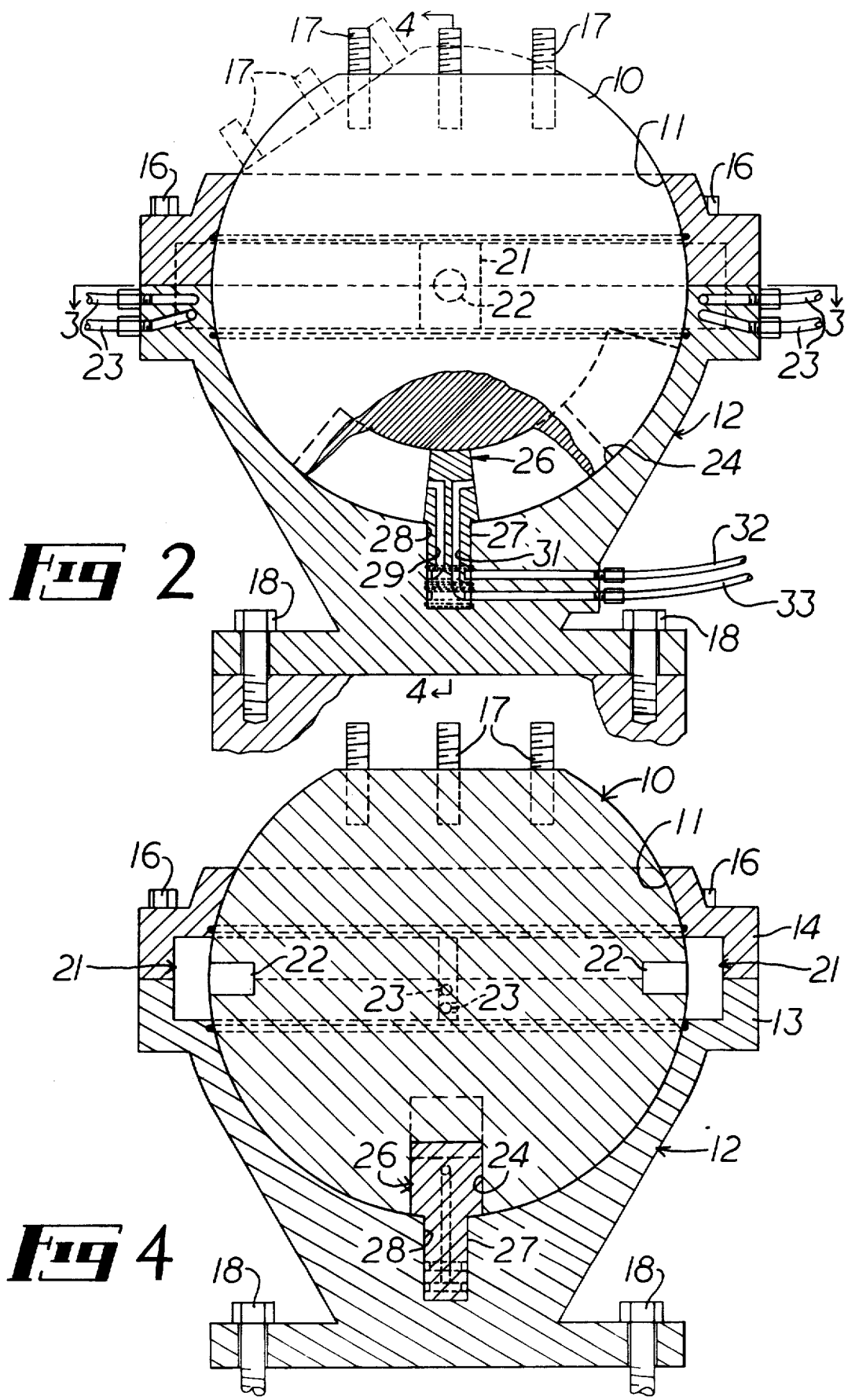
FIG. 2 is a vertical sectional view taken generally along the line 2—2 of FIG. 1.
FIG. 4 is a sectional view taken generally along the line 4—4 of FIG. 2.

Referring now to the drawings for a better understanding of my invention, I show a ball-like member 10 which is mounted for rotation in a socket 11 provided in a housing 12. As shown in FIGS. 2 and 4, the housing 12 is split adjacent the center of the ball-like member 19 to provide a lower portion 13 and an upper portion 14 which are detachably connected to each other by suitable retaining bolts 16. The inner surface of the socket 11 extends an angular distance around the ball-like member 10 whereby the ball-like member 10 is retained in the socket with a portion of the ball-like member 10 projecting outwardly of the socket 11, as shown. The ball-like member 10 is provided with suitable connector members 17, such as outwardly projecting threaded members, whereby the ball-like members may be connected to another element, such as an adjacent piece of machinery in the form of a boom or the like. The housing 12 is connected to another element, such as an adjacent piece of machinery, by suitable bolts 18.

Figure 1:
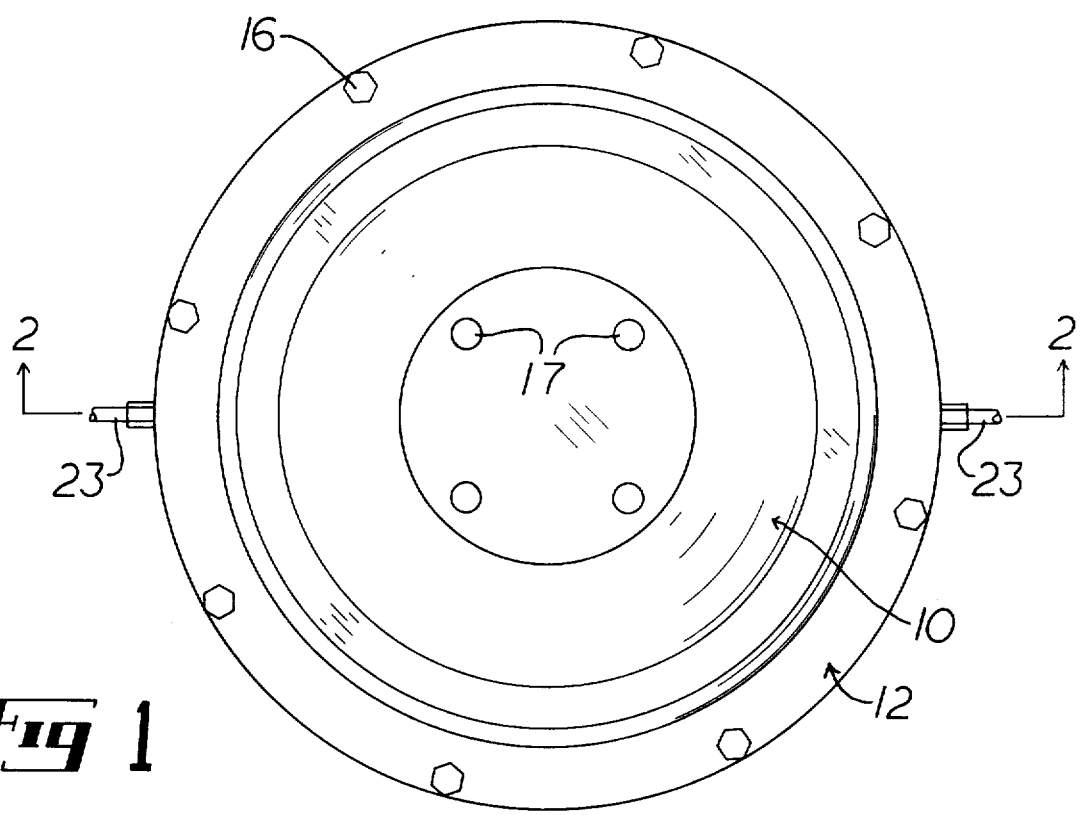
FIG. 1 is a top plan view showing my improved directional positioner.
Figure 3:
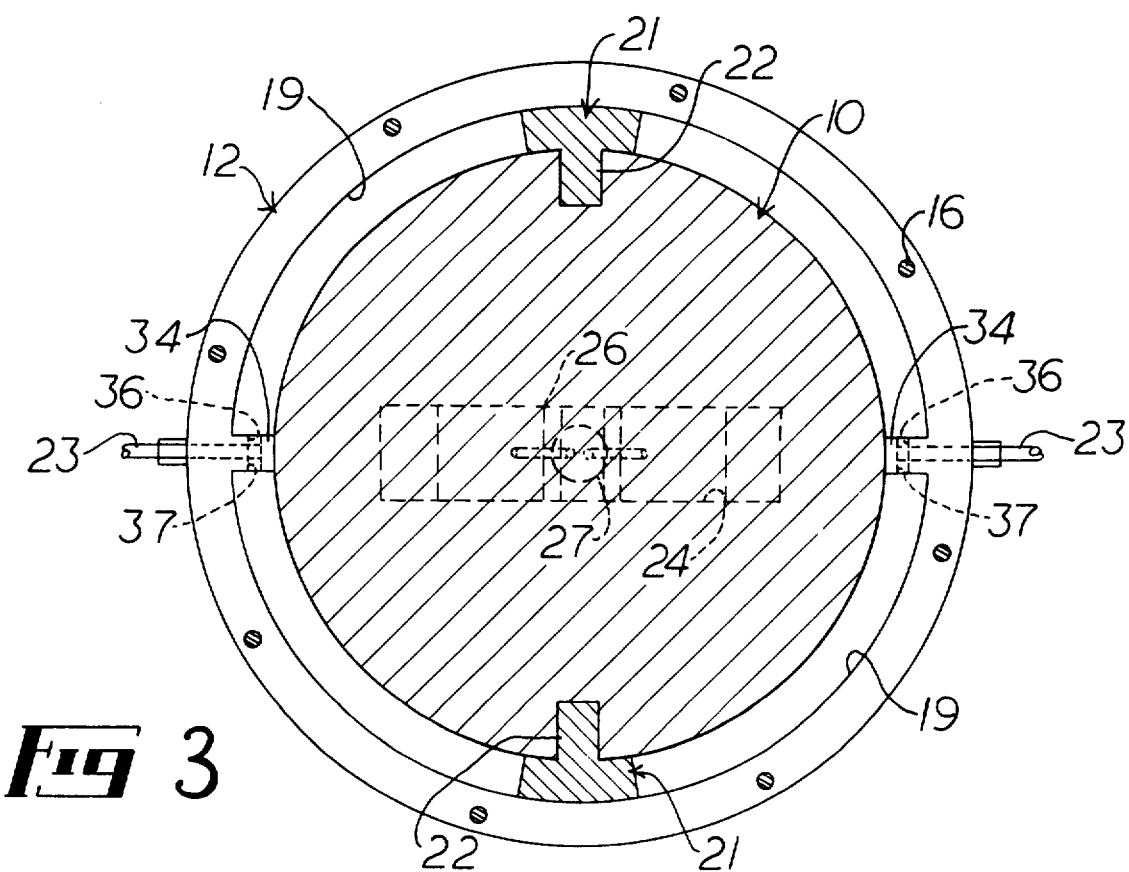
FIG. 3 is a sectional view taken generally along the line 3—3 of FIG. 2.

As shown in FIGS. 2, 3 and 4, arcuate grooves 19 are provided in the inner surface of the socket 11 in housing 12 with each groove 19 extending in a plane passing generally through the center of the ball-like member 10. A piston 21 is mounted in each arcuate groove and is pivotally connected to the adjacent side of the ball-like member 10, as shown in FIGS. 3 and 4. That is, each piston 21 is provided with an inwardly extending pivot pin or shaft 22 which pivotally connects each piston 21 to the adjacent side of the ball-like member 10. Fluid under pressure is introduced into each arcuate groove 19 selectively at opposite sides of the piston 21 by supply conduits 23 to impart relative movement between the ball-like member 10 and the housing 12. That is, to impart clockwise rotation to the ball-like member 10, as viewed in FIG. 3, fluid under pressure is introduced at the right side of each piston 21, as viewed from the outside of the ball-like member 10 looking toward the center thereof. To rotate the ball-like member 10 in a counter-clockwise direction, fluid under pressure is introduced through the conduits 23 into the arcuate grooves 19 at the opposite sides of the pistons 21. While I have shown two arcuate grooves 19 in the socket 11 of housing 12, it will be apparent that one or more such arcuate grooves may be employed. Where more than two arcuate grooves 19 are employed, additional fluid supply lines 23 would be added and the fluid under pressure would be introduced at the proper sides of the pistons 21 to move the same in the arcuate grooves in the desired direction.

An arcuate groove 24 is provided in the outer surface of the ball-like member 10 with the groove 24 extending in a plane passing generally through the center of the ball-like member and perpendicular to the arcuate groove 19 in the inner surface of the housing 12. Mounted in the arcuate groove 24 is a piston 26 which carries a laterally and outwardly projecting shaft-like member 27 which is mounted for rotation in a bearing recess 28 carried by the housing 12, as shown in FIGS. 2 and 4. As shown in FIG. 2, the piston 26 and its laterally projecting shaft-like member 27 is provided with fluid supply passageways 29 and 31 therethrough for supplying fluid under pressure into the arcuate groove 24 at either side of the piston 26. Fluid is introduced into the passageways 29 and 31 through supply conduits 32 and 33, respectively, which communicate with a suitable source of supply. It will be understood that as fluid under pressure is supplied through conduit 32 to the groove 24 at one side of piston 26, the fluid at the opposite side of piston 26 is exhausted through conduit 33. Also, as fluid under pressure is introduced through conduit 33, fluid is exhausted through conduit 32. In like manner, as fluid under pressure is introduced through one supply conduit 23 into the arcuate groove 19 at one side of the piston 21, the fluid at the opposite side of piston 21 is exhausted through another conduit 23 which communicates with that portion of the arcuate groove 19.

From the foregoing description, the operation of my improved multi-directional positioner will be readily understood. The ball-like member 10 is connected to one element or working tool by the connector member 17 while the housing 12 is connected to another element or supporting structure by the retaining bolts 18. To rotate the ball-like member 10 in a vertical plane, fluid under pressure is supplied selectively to the groove 24 at either side of the piston 26 by introducing the fluid through either of the supply conduits 32 or 33. That is, to rotate the ball-like member in a vertical plane and in a clockwise direction, as viewed in FIG. 2, fluid under pressure is introduced through conduit 32 and conduit 29 whereupon the fluid enters the groove 24 at the left side of piston 26 to thus impart clockwise rotation to the ball-like member. As the ball-like member 10 moves in a clockwise direction, fluid is exhausted through the conduits 31 and 33. To rotate the ball-like member 10 in the opposite direction, fluid under pressure is introduced through conduits 33 and 31 into the groove 24 at the right side of piston 26, as viewed in FIG. 2. As the ball-like member moves in a counter-clockwise direction, the fluid is exhausted through conduit 32. To rotate the ball-like member 10 in horizontal plane, fluid under pressure is introduced into the arcuate groove 19 at one side of each piston 21 to move the piston 21 and the ball-like member 10 in the desired direction. That is to rotate the ball-like member 10 in a clockwise direction, as viewed in FIG. 3, fluid under pressure is introduced through conduit 23 into that portion of the arcuate groove 19 at the right of each piston 21 as viewed from the outside of the ball-like member looking toward the center thereof. As the fluid under pressure is introduced into that portion of the arcuate groove 19, the fluid is forced out of that portion of the arcuate groove 19 located at the opposite side of piston 21 whereupon the fluid is exhausted through a conduit 23. To rotate the ball-like member 10 in a counter-clockwise direction, as viewed in FIG. 3, fluid under pressure is introduced into the arcuate groove 19 at the left side of each piston 21 as viewed from the outer surface of the ball-like member 10 looking toward the center thereof. Fluid in the arcuate groove 19 at the opposite side of each piston 21 is then exhausted through the conduit 23 communicating with that portion of the arcuate groove 19. It will be noted that in FIG. 3 of the drawings, I show two arcuate grooves 19 in the housing 12 which are separated from each other by partition members 34. The inner ends of the conduits 23 communicate with suitable passageways 36 and 37 through the partition 34 whereby fluid may be introduced or removed from the adjacent portions of the arcuate grooves 19. It will be noted that the upper conduit 23 at the left side of FIG. 2 communicates with the passageway 36 adjacent thereto while the upper conduit 23 at the right side of FIG. 2 communicates with the passageway 37 adjacent thereto. The lower conduit 23 at the left side of FIG. 2 communicates with the passageway 37 adjacent thereto while the lower conduit 23 at the right side of FIG. 2 communicates with the passageway 36 adjacent thereto. Accordingly to rotate the ball-like member 10 in a clockwise direction, as viewed in FIG. 3, fluid under pressure is introduced through both upper conduits 23, as shown in FIG. 2, whereby fluid passes into the arcuate groove 19 at the left side of piston 21 shown at the upper side of FIG. 3 and fluid passes into the arcuate groove 19 at the right side of piston 21 shown at the lower side of FIG. 3. To rotate the ball-like member 10 in a counter-clockwise direction, as viewed in FIG. 3, fluid under pressure is introduced through both lower conduits 23, as shown in FIG. 2, whereby fluid passes into the arcuate groove 19 at the right side of piston 21 shown at the upper side of FIG. 3 and fluid passes into the arcuate groove 19 at the left side of piston 21 shown at the lower side of FIG. 3.

It will be noted that as the ball-like member 10 rotates in a horizontal direction relative to the housing 12 it pivots about the pivot pin or shaft-like member 27. On the other hand, when the ball-like member 10 rotates in a vertical plane, the ball-like member 10 pivots about the shaft-like members or pines 22.

Figure 5:
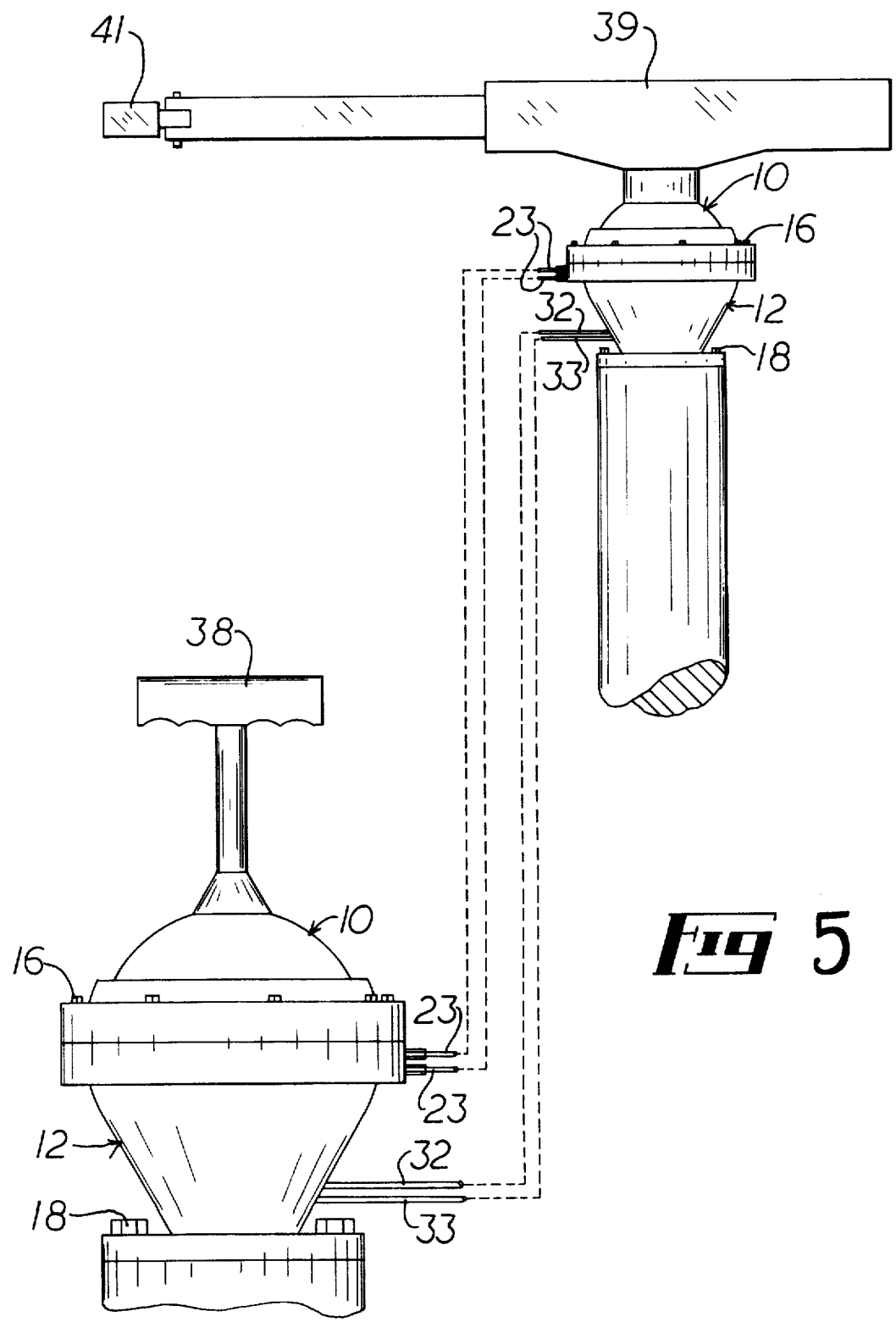
FIG. 5 is a side elevational view showing a pair of my improved multi-directional positioners operatively connected to each other by interconnecting the means for introducing fluid under pressure into the arcuate grooves in the balls and sockets, respectively, whereby relative movement of one positioner imparts a like relative movement of the other positioner.

In FIG. 5 of the drawings, I show a pair of multi-directional positioners which are operatively connected to each other by interconnecting the conduits 23 which supply fluid to and exhaust fluid from the arcuate groove 19 in the housing 12 and by interconnecting the conduits 32 and the conduits 33 which supply fluid to and exhaust fluid from the arcuate groove 24. By so connecting the positioner, relative movement between the ball-like member 10 and the housing 12 of one positioner imparts a like relative movement between the ball-like member 10 and the housing 12 of the other positioner. An operator control handle 38 is connected to the ball-like member 10 of one positioner while a movable arm 39 is connected to the ball-like member 10 of the other positioner. The housing 12 of each positioner shown in FIG. 5 is secured to a supporting structure by the retaining bolts 18. The movable arm 39 carries a suitable working element or tool 41 which may be moved to selected positions in both vertical and horizontal planes by merely moving the control handle 38 in the desired direction. This master-slave type action is accomplished by tilting or rotating the handle 38 carried by the ball-like member 10 on the "master" positioner which causes motion of the pistons 21 in grooves 19 or movement of the groove 24 relative to piston 26. Due to the closed fluid system movement imparted to the pistons 21 or movement imparted to the ball-like member 10 by introducing fluid into groove 24 at selected sides of piston 26, by movement of handle 38, displaces fluid in the particular groove or grooves in the "master" positioner. Due to the closed fluid system this displacement of fluid in the "master" positioner causes the column of fluid in the conduits 23, 32 or 33, depending upon the plane and direction of movement of the handle 38, to move, and in turn supply fluid under pressure into the corresponding grooves in the "slave" positioner which carries the arm 39. This pressure causes motion of the pistons 21 relative to grooves 19 and movement of the grooves 24 relative to piston 26 in the "slave" positioner corresponding to the motion imparted to the "master" positioner by manipulating handle 38, thereby moving arm 39 and tool 41 which are carried by the ball-like member 10 on the "slave" positioner.

From the foregoing, it will be seen that I have devised an improved multi-directional positioner which is simple of construction, economical of manufacture and one which may be operated by unskilled labor. By providing a self-contained unit, the positioner requires a minimum of space for installation, thus facilitating installation and permitting use of my improved positioner in locations where a minimum of space is available While I have shown my invention in but one form, it will be obvious to those skilled in the art that it is not so limited, but is susceptible of various changes and modifications without departing from the spirit thereof.

What I claim is:

1. In a multi-directional positioner for moving one element relative to another element,
   a. a ball-like member,
   b. housing having a socket therein receiving said ball-like member with a rotating fit with the inner surface of said socket extending an angular distance around said ball-like member to retain said ball-like member in said socket with a portion of said ball-like member projecting outwardly of said socket,
   c. means operatively connecting said portion of the ball-like member projecting outwardly of said socket to said one element,
   d. means operatively connecting said housing to said another element,
   e. at least one arcuate groove in the inner surface of said housing extending in a plane passing generally through the center of said ball-like member,
   f. a piston in said arcuate groove in said housing and pivotally connected to the adjacent side of said ball-like member,
   g. means to introduce fluid under pressure into said arcuate groove in said housing selectively at opposite sides of the piston therein to impart relatively movement between said ball-like member and said housing,
   h. at least one arcuate groove in the outer surface of said ball-like member extending in a plane passing generally through the center of said ball-like member and perpendicular to said arcuate groove in the inner surface of said housing,
   i. a piston in said arcuate groove in the outer surface of said ball-like member and pivotally connected to the adjacent portion of said housing, and
   j. means to introduce fluid under pressure into said arcuate groove in the outer surface of said ball-like member selectively at opposite sides of the piston therein to impart relative movement between said ball-like member and said housing.

2. A multi-directional positioner as defined in claim 1 in which oppositely disposed arcuate grooves are provided in the inner surface of said housing with oppositely disposed pistons therein pivotally connected to opposite sides of said ball-like member.

3. A multi-directional positional as defined in claim 1 in which said means to introduce fluid under pressure into said arcuate groove in said housing comprises a fluid supply conduit communicating with said arcuate groove in said housing at each side of said piston therein.

4. A multi-directional positional as defined in claim 1 in which said piston in said arcuate groove in the outer surface of said ball-like member is provided with fluid supply passageways therethrough for supplying fluid under pressure selectively at opposite sides of said piston in said arcuate groove in the outer surface of said ball-like member.

5. A multi-directional positioner as defined in claim 1 in which said piston in said arcuate groove in the outer surface of said ball-like member carries a laterally and outwardly projecting shaft-like member which is mounted for rotation in a bearing recess carried by said housing.

6. A multi-directional positioner as defined in claim 5 in which said projecting shaft-like member is provided with fluid supply passageways therethrough which communicate with fluid supply passageways through said piston in said arcuate groove in the outer surface of said ball-like member.

7. A multi-directional positioner as defined in claim 1 in which a pair of said multi-directional positioners are operatively connected to each other by interconnecting said means to introduce fluid under pressure into said arcuate groove in said housing and by interconnecting said means to introduce fluid under pressure into said arcuate groove in the outer surface of said ball-like member so that upon relative movement between said ball-like member and said housing of one positioner imparts a like relative movement between said ball-like member and said housing of the other positioner.

* * * * *